J. REUTHER.
POTATO DIGGER.
APPLICATION FILED APR. 23, 1909.
952,946.
Patented Mar. 22, 1910.
2 SHEETS—SHEET 1.
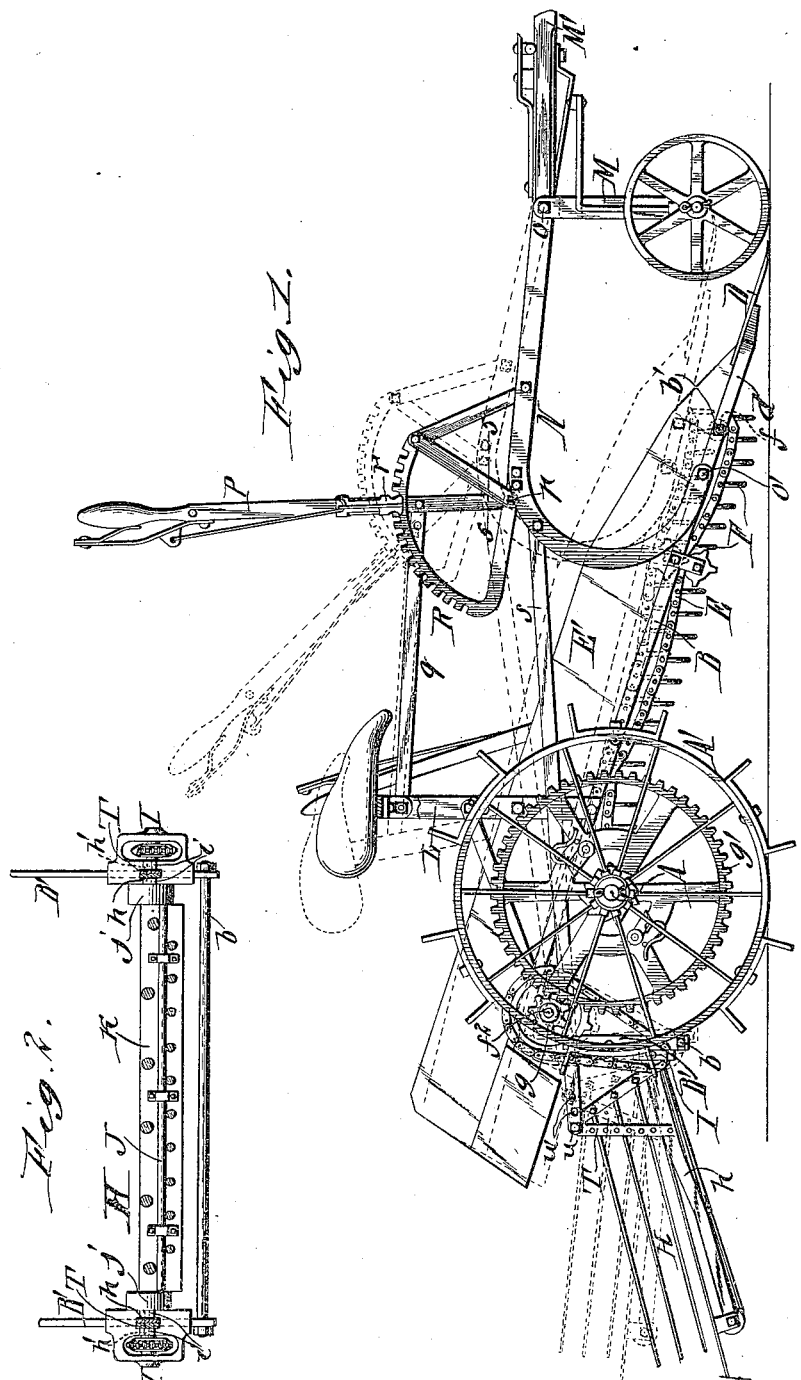

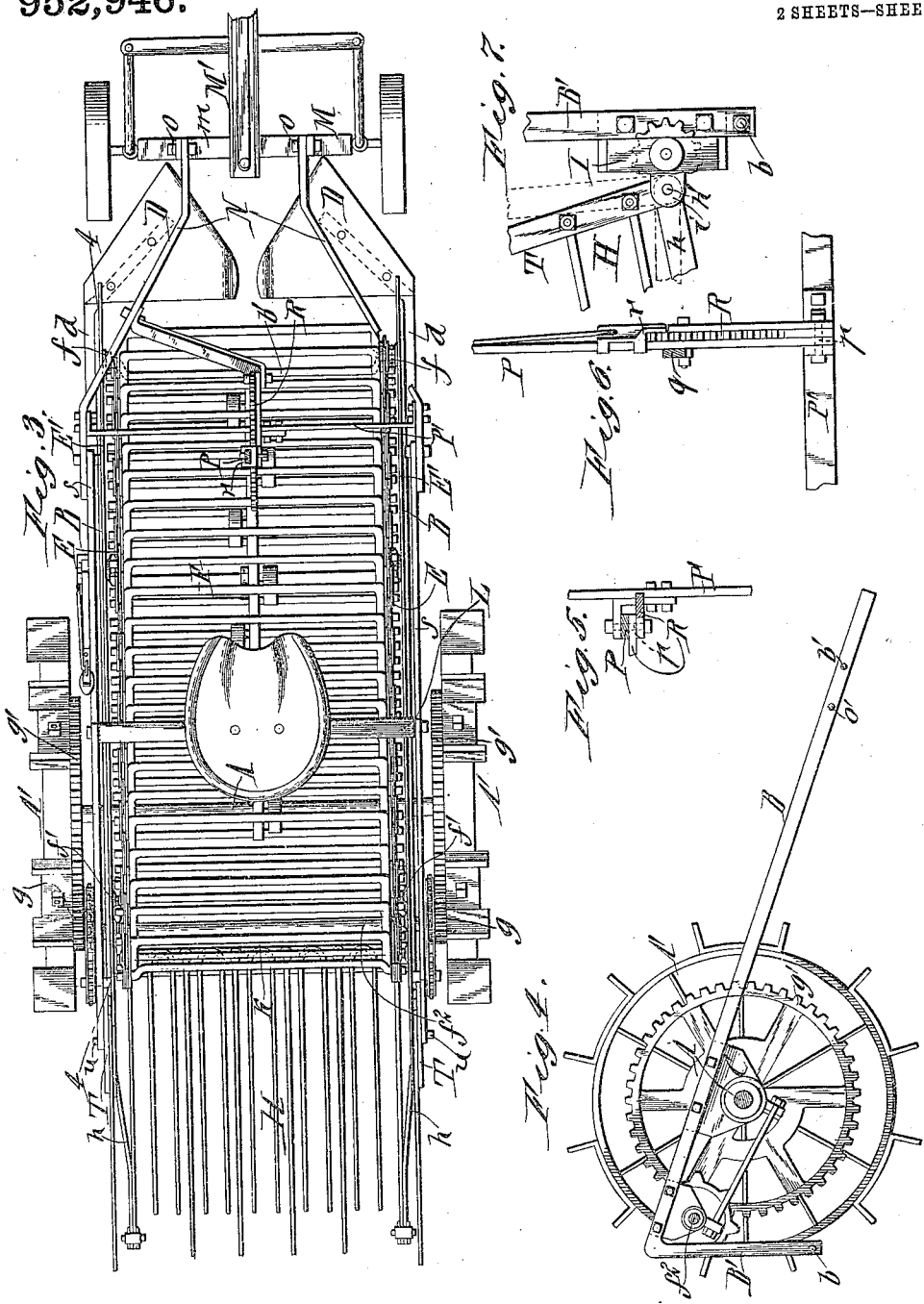

UNITED STATES PATENT OFFICE.

JOHN REUTHER, OF EAST AURORA, NEW YORK.

POTATO-DIGGER.

952,946.  Specification of Letters Patent.  Patented Mar. 22, 1910.

Original application filed March 13, 1908, Serial No. 420,794. Divided and this application filed April 23, 1909. Serial No. 491,684.

*To all whom it may concern:*

Be it known that I, JOHN REUTHER, a citizen of the United States, residing at East Aurora, in the county of Erie and State of New York, have invented a new and useful Improvement in Potato-Diggers, of which the following is a specification.

This invention has more particular reference to potato diggers of the type comprising a plow or digging blade, an endless elevator or main separator which receives the potatoes, earth and vines from the plow, and a shaker or secondary separator which receives the potatoes and remaining soil and vines from the elevator and effects a final separation thereof.

The present application is a division of my application filed March 13, 1908, Serial No. 420,794, upon which Patent No. 922,816, was granted May 25, 1909.

One of the objects of this invention is to facilitate the elevation and vertical adjustment of the plow.

A further object is to so combine the shaker and the plow-carrying frame that the plow cannot be raised for moving the machine from place to place without at the same time elevating the shaker, thus preventing injury to the shaker in backing the machine which is liable to occur when these parts are separately operated and the operator forgets to elevate the shaker.

In the accompanying drawings consisting of 2 sheets: Figure 1 is a side elevation, partly in section, of a potato digger embodying the invention. Fig. 2 is a transverse vertical section of the shaker and its supports taken immediately in rear of its cross head. Fig. 3 is a top plan view of the machine. Fig. 4 is a longitudinal section on line 4—4, Fig. 3. Fig. 5 is a horizontal section on line 5—5, Fig. 1. Fig. 6 is a rear view of the lifting lever and its support. Fig. 7 is a fragmentary side elevation, on an enlarged scale, of the shaker and the support to which it is pivoted.

Similar letters of reference indicate corresponding parts throughout the several views.

A indicates the main axle of the machine to which the ground wheels $A^1$ are secured in the customary manner. Upon this axle is supported the main frame which, in the construction shown, comprises forwardly-inclined side bars B, vertical extensions $B^1$ depending from the rear ends of said bars, a rear tie-rod $b$ connecting the lower ends of said extensions and a front tie-rod $b^1$ connecting the front portions of said side-bars. As shown in Fig. 4, the axle A is mounted in bearings C secured to the side bars B.

The digging device of the machine may be of any suitable construction, that shown in the drawings comprising a pair of pointed plows or shovels D carried by arms $d$ secured to the front ends of the side bars.

The elevator or main separator is arranged immediately behind the plows D. This separator may be of any suitable construction. That shown in the drawings comprises a pair of endless sprocket chains E and cranked transverse rods F carried by the same and spaced to intercept potatoes, as more fully described in the application hereinbefore referred to. These chains E run around guide rollers $f$ mounted on the front tie rod $b^1$ and around sprocket wheels $f^1$ secured to a transverse shaft $f^2$ carried by the side bars B and driven from the ground wheels by pinions $g$ and gear wheels $g^1$.

H indicates the shaker or final separator having its head located underneath the delivery end of the elevator F. This shaker may be of any suitable construction and actuated by any appropriate means, but its front end is preferably pivoted to the frame of the machine, so that its rear end can swing vertically and be raised clear of the ground in moving the machine from place to place.

In the preferred construction shown in the drawings, the front ends of the side bars $h$ of the shaker are pivoted by transverse pins $h^1$ to lugs $i$ projecting rearwardly from bearing boxes I secured to the frame-bars $B^1$, as shown in Figs. 2 and 7. In these boxes are journaled eccentrics $j$ which carry a transverse crank shaft J to which the cross head K of the shaker is attached, as more fully described and illustrated in my previous application hereinbefore referred to.

L indicates a seat supporting yoke or frame which straddles the elevator and is secured at its sides to the side bars B of the main frame and the side plates $E^1$ of the elevator.

M indicates the usual draft truck which carries the front portion of the machine and to which the draft pole $M^1$ is attached.

The front portions of the side bars B are connected with the cross-bar or bolster $m$ of the truck by longitudinal draft or connecting bars N which are pivoted at their front ends to lugs of said bolster by transverse bolts $o$ and at their rear ends to the side bars B by similar bolts $o^1$. The bars N constitute a draft frame or connection between the truck and the main frame which carries the plows. These bars preferably converge forwardly, as shown in Fig. 3, and their rear portions are curved downwardly and forwardly as shown in Fig. 1.

P is a hand-lever arranged in front of the seat in convenient reach of the driver and pivoted at its lower end to a cross-bar $P^1$ connecting the bars N, $p$ indicating the pivot of the lever. This lever swings lengthwise of the machine and is connected with the seat-yoke L by a link $q$. This lever has a locking catch $r$ of any suitable construction which engages a toothed segment R carried by the cross-bar $P^1$. $s$ represents longitudinal links connecting the upper ends of the shaker arms T with the rear portions of the connecting bars N. These arms are rigidly secured to the side bars $h$ of the shaker adjacent to the pivots $h^1$. By this construction, upon pulling the hand lever P rearwardly, the main or elevator-frame which carries the plows D is raised to the position shown by dotted lines in Fig. 1 and at the same time the rear end of the shaker is raised to the dotted position in the same figure, thus simultaneously lifting the plows and the shaker clear of the ground for transporting the machine from place to place. In thus raising these parts, the seat-yoke L is tilted backward with the hand lever, and as the yoke is rigidly secured to the elevator-frame, the front portion of the latter which carries the plows is swung upward to the dotted position shown in Fig. 1. During this upward movement of the front part of the elevator-frame and the connecting bars N, these bars also move forward to a certain extent as will be seen in Fig. 1, and as the shaker-frame is connected with those bars by the links $s$, it is swung upward in an obvious manner. This construction renders it impossible for the operator to lift the plow D without at the same time raising the shaker, thus avoiding all liability of breaking the shaker or injuring its tines in backing the machine, which is liable to occur in machines in which the shaker is raised by a separate hand-lever and the operator neglects to pull that lever as well as the usual hand-lever for lifting the plow. By the construction shown, the raising of the plows and the shaker can be accomplished with little effort when the machine is in operation, because although the plows tend to penetrate the ground, this tendency is counteracted by the draft which tends to raise the plows.

The connections $s$ between the shaker frame and the connecting-bars N are preferably adjustable, so that they can be lengthened or shortened to change the position of the shaker in relation to the plows D. The preferred adjusting means shown in the drawings consist of horizontal bolts $u$ passing through the shaker arms T and longitudinal series of holes $u^1$ in the rear ends of the links $s$, through a pair of which said bolts pass.

While the shaker-frame and the draft bars N are preferably linked together, so that the shaker and the plows rise and fall simultaneously, my improved lifting mechanism may in some cases be applied only to the main frame which carries the plows and the elevator. In this case the links $s$ are omitted, and separate means such as heretofore in common use may be employed for elevating the shaker.

I claim as my invention:

1. In a machine of the character described, the combination of the axle, a vertically-swinging main frame mounted on the axle, a plow carried by said frame, a draft frame arranged in front of the main frame and pivotally connected to the front portion thereof, a member rigidly connected to the main frame and extending upwardly therefrom, lifting means mounted on said draft frame, and a connection extending from said lifting means to said rigid member.

2. In a machine of the character described, the combination of the axle, a vertically-swinging main frame mounted on the axle, a plow carried by said frame, a yoke rigidly secured to said main frame and extending upwardly therefrom, a draft frame pivotally connected to the front portion of said main frame, a lever mounted on said draft-frame, and a connection extending from said lever to said yoke.

3. In a machine of the character described, the combination of the axle, a vertically-swinging main frame mounted on the axle, a plow carried by said frame, a yoke rigidly secured to said main frame and extending upwardly therefrom, a draft frame pivotally connected to the front portion of said main frame, a lever mounted on said draft-frame, a connection extending from said lever to said yoke, and means for locking said lever in different positions.

4. In a machine of the character described, the combination of the axle, a vertically-swinging frame mounted on the axle, a plow carried by said frame, a seat-yoke rigidly connected to the main frame, a draft truck, bars connected at their front ends to the truck and having their rear ends pivotally connected to said main frame, a lifting lever carried by said bars, and a connection extending from said lever to the seat-yoke.

5. In a machine of the character described, the combination of the axle, a vertically-swinging frame mounted on the axle, a plow carried by said frame, a seat-yoke rigidly connected to the main frame, a draft-truck, longitudinal connecting bars attached at their front ends to said truck and having their rear portions curved downwardly and forwardly and pivoted to said main frame, a cross bar connecting said longitudinal bars, a lifting lever mounted on said cross bar, and a link connecting said lever with the seat-yoke.

6. In a machine of the character described, the combination of the axle, a vertically-swinging main frame mounted on the axle, a plow carried by said frame, a draft frame pivoted to the front portion of the main frame to swing vertically therewith, a vertically-swinging separator arranged on the rear side of the axle, lifting means mounted on said draft frame and connected with said main frame, and means for connecting the separator with said draft frame.

7. In a machine of the character described, the combination of the axle, a vertically-swinging main frame mounted on the axle, a plow carried by said frame, a draft frame pivoted to the front portion of the main frame to swing vertically therewith, a vertically-swinging separator arranged on the rear side of the axle and having its front end pivotally mounted on the main frame, a lifting lever mounted on said draft frame, a connection between said lever and said main frame, and a connection between said draft frame and the separator.

8. In a machine of the character described, the combination of the axle, a vertically-swinging main frame mounted on the axle, a plow carried by said frame, a seat-yoke rigidly secured to the main frame, a draft frame pivoted to the front portion of the main frame, a vertically-swinging separator arranged on the rear side of the axle and having its front end pivotally mounted on the main frame, a lifting lever mounted on said draft frame, a link connecting said lever with the seat-yoke and a second link connecting the separator with said draft frame.

Witness my hand this 20th day of April, 1909.

JOHN REUTHER.

Witnesses:
 THEO. L. POPP,
 ANNA HEIGIS.